US007204151B2

United States Patent
Kitamoto et al.

(10) Patent No.: US 7,204,151 B2
(45) Date of Patent: Apr. 17, 2007

(54) SEAL LOAD INSPECTION APPARATUS

(75) Inventors: Hiroaki Kitamoto, Kanazawa (JP);
Katsuji Tsuruyama, Kanazawa (JP);
Toshiharu Kanaiwa, Kanazawa (JP)

(73) Assignee: Shibuya Kogyo Co., Ltd., Kanazawa-shi (JP)

( * ) Notice: Subject to any disclaimer, the term of this patent is extended or adjusted under 35 U.S.C. 154(b) by 65 days.

(21) Appl. No.: 11/130,006

(22) Filed: May 16, 2005

(65) Prior Publication Data
US 2005/0257623 A1    Nov. 24, 2005

(30) Foreign Application Priority Data
May 21, 2004    (JP)    ............... 2004-152496

(51) Int. Cl.
*B67B 1/06* (2006.01)
*B67B 1/00* (2006.01)
*B67B 3/26* (2006.01)
*G01L 5/00* (2006.01)

(52) U.S. Cl. ............... 73/761; 53/484; 53/485; 53/488; 53/489; 53/490; 53/491; 73/760

(58) Field of Classification Search .......... 73/761; 53/484, 485, 488, 489, 490, 491
See application file for complete search history.

(56) References Cited

U.S. PATENT DOCUMENTS

| 3,964,240 A * | 6/1976 | Evrard ............... 53/306 |
| 4,811,857 A * | 3/1989 | Thompson .......... 215/329 |
| 6,105,343 A * | 8/2000 | Grove et al. ......... 53/490 |
| 6,158,196 A * | 12/2000 | Trebbi et al. ......... 53/331.5 |
| 6,499,577 B2 * | 12/2002 | Kitamoto et al. ...... 192/85 R |
| 6,519,913 B2 * | 2/2003 | Higashizaki et al. ... 53/75 |
| 6,874,301 B2 * | 4/2005 | Kitamoto .............. 53/490 |
| 6,948,297 B2 * | 9/2005 | Kitamoto .............. 53/490 |
| 7,024,837 B2 * | 4/2006 | Takebe et al. .......... 53/490 |
| 2001/0018820 A1 * | 9/2001 | Kitamoto .............. 53/490 |
| 2002/0116897 A1 * | 8/2002 | Higashizaki et al. ... 53/331.5 |
| 2005/0022479 A1 * | 2/2005 | Kitamoto .............. 53/490 |

FOREIGN PATENT DOCUMENTS

| JP | 61-189 | 1/1986 |
| JP | 08-058889 | 3/1996 |

* cited by examiner

*Primary Examiner*—Edward Lefkowitz
*Assistant Examiner*—Freddie Kirkland, III
(74) *Attorney, Agent, or Firm*—Flynn, Thiel, Boutell & Tanis, P.C.

(57) ABSTRACT

A metal cap 12 is fitted over a vessel (vial 2), into which a rubber plug 4 is driven, and using a pressure block 10, a load is applied to the cap 12 through the top surface 12b thereof to maintain the rubber plug 4 compressed. Under this condition, a tightening roller 14 folds a skirt (lower end 12c of a cylindrical portion 12a) of the cap 12 inwardly to perform a tightening operation. Subsequently, the load applied to the top surface 12b of the cap is once released, and then a load is applied again starting from a value FB which is less than the load FA applied during the tightening operation, gradually increasing to a higher value. In the course of increasing the load, a load FC at the instant when a displacement in the elevation of the top surface of the cap is detected, and this load FC is determined to be a seal load upon completion of the tightening operation. By detecting the load FC upon completion of the tightening operation, a seal capacity of the rubber plug 14 can be confirmed.

7 Claims, 13 Drawing Sheets

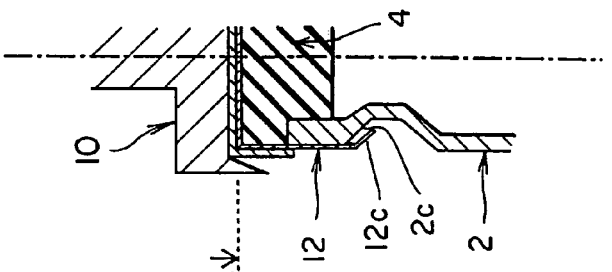
FIG. 4B  FIG. 4C  FIG. 4D
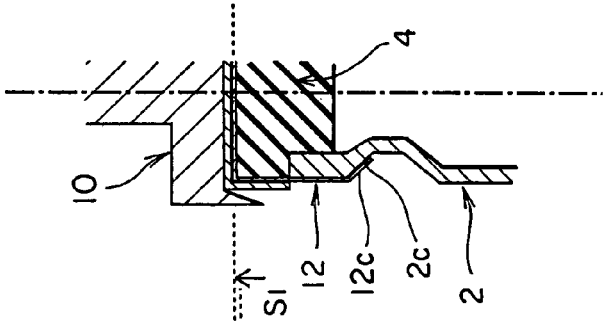
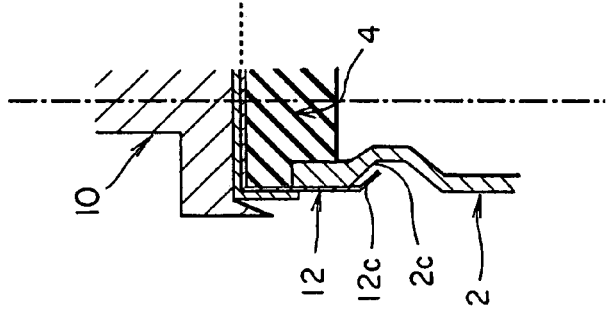
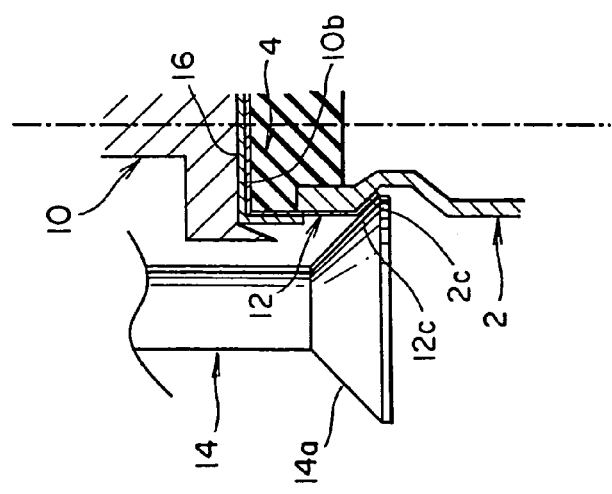
FIG. 4A

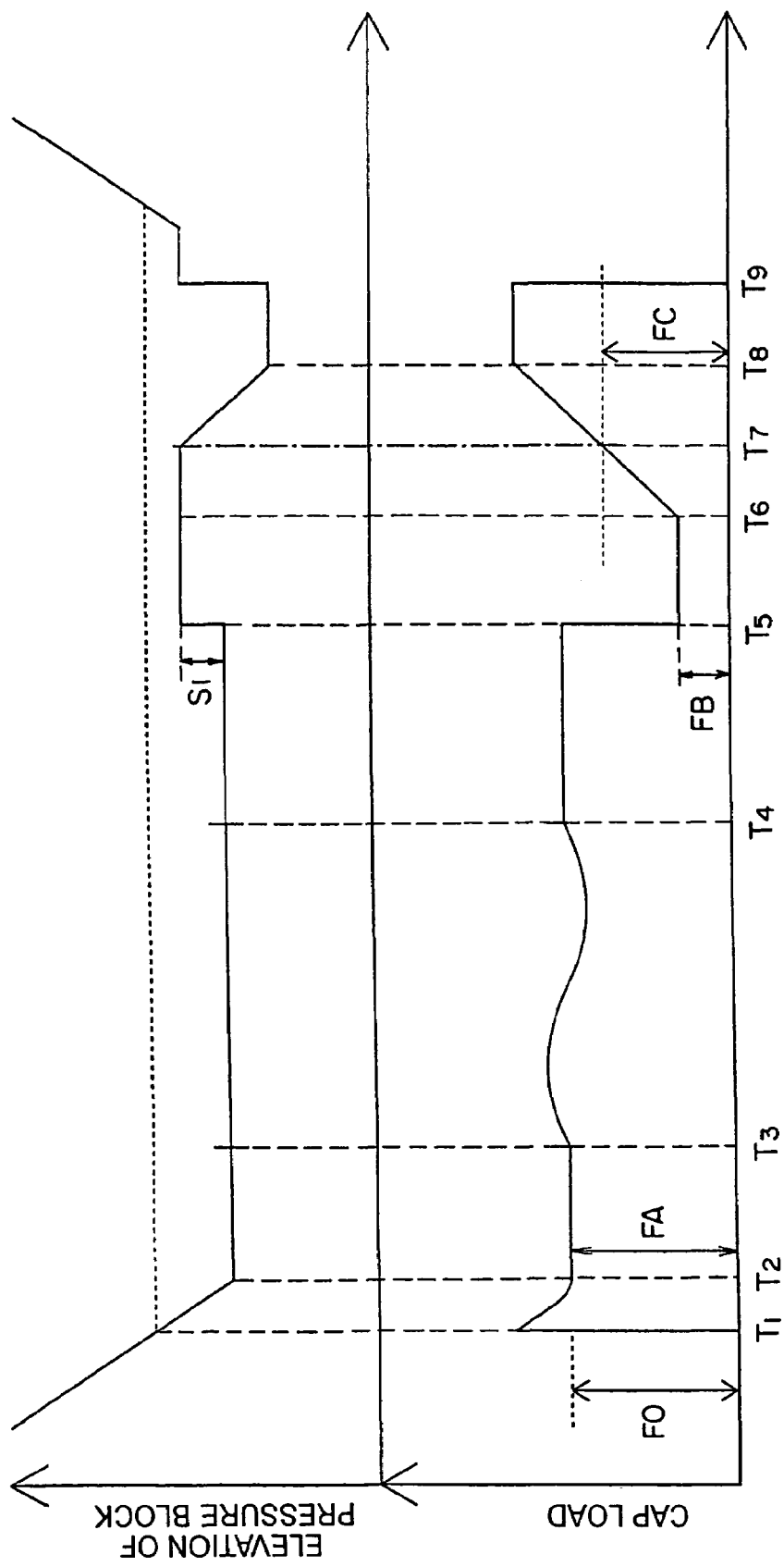

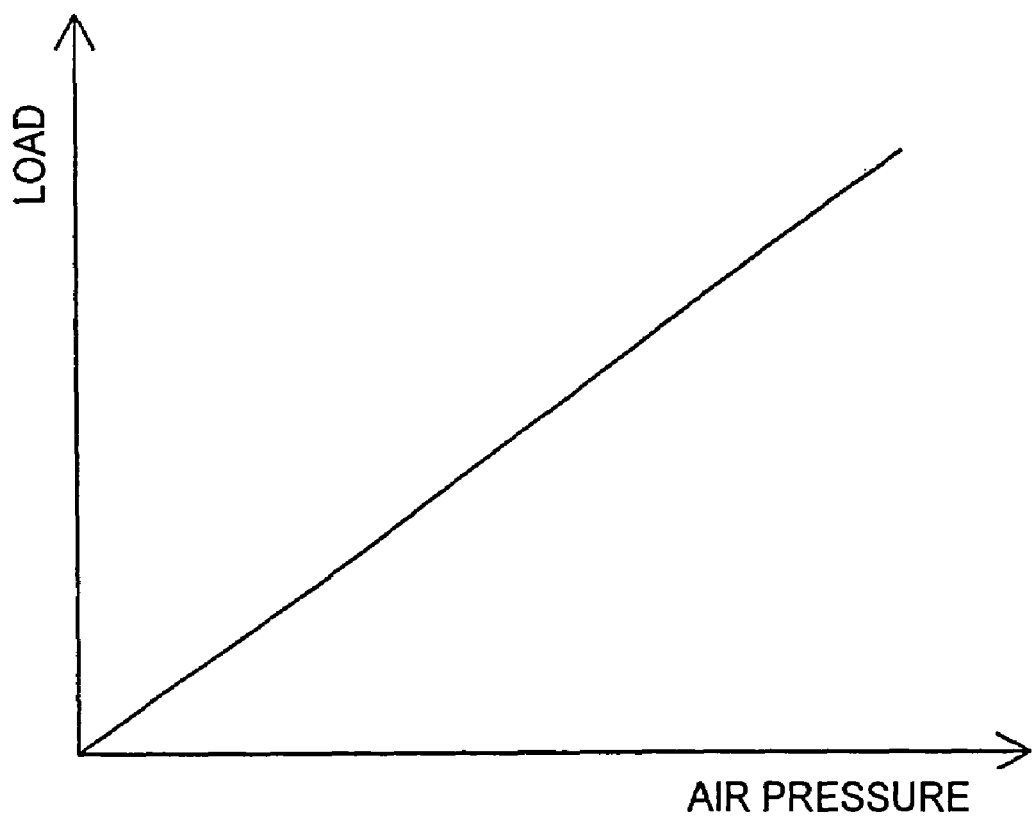

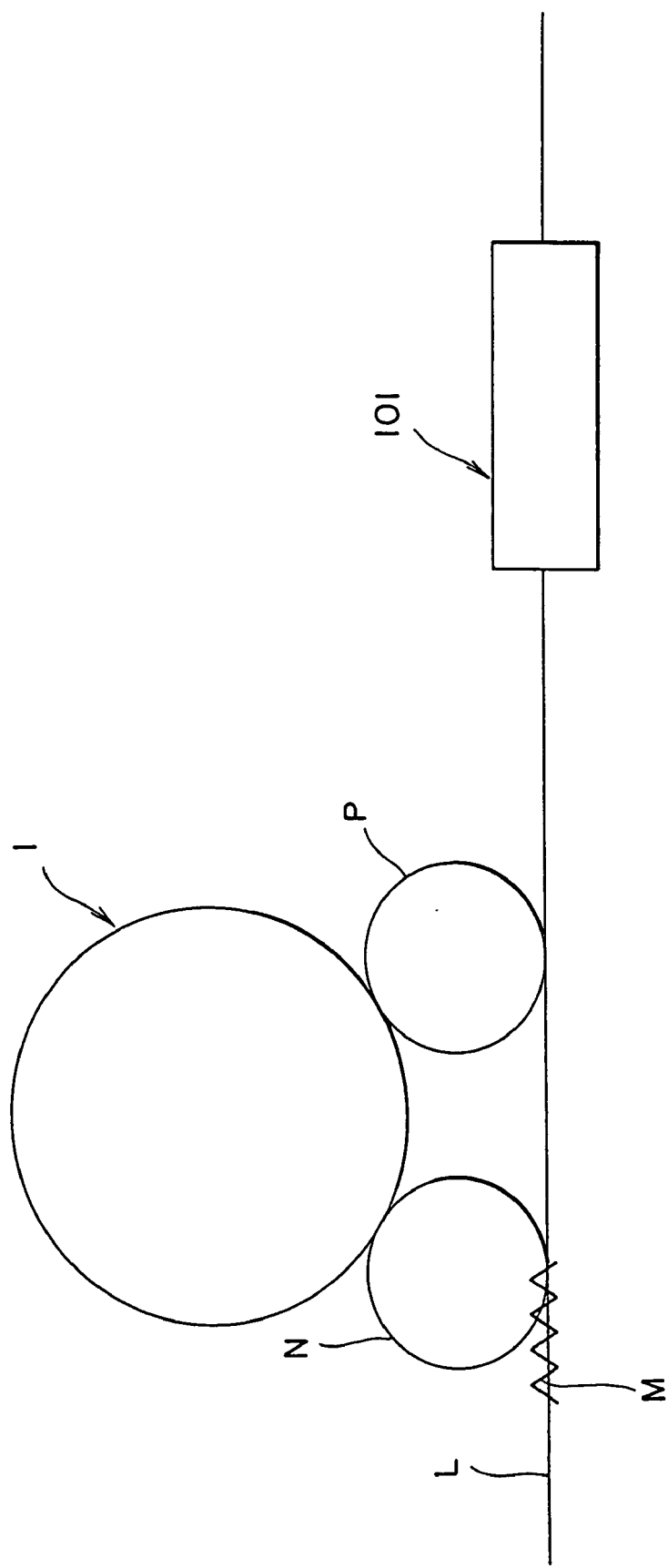

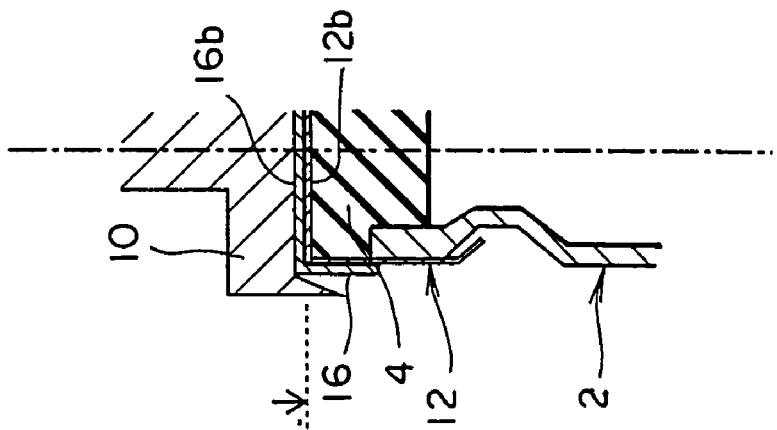
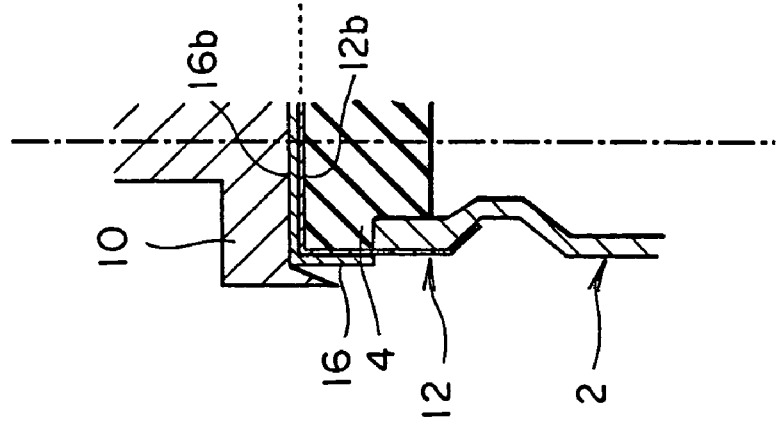
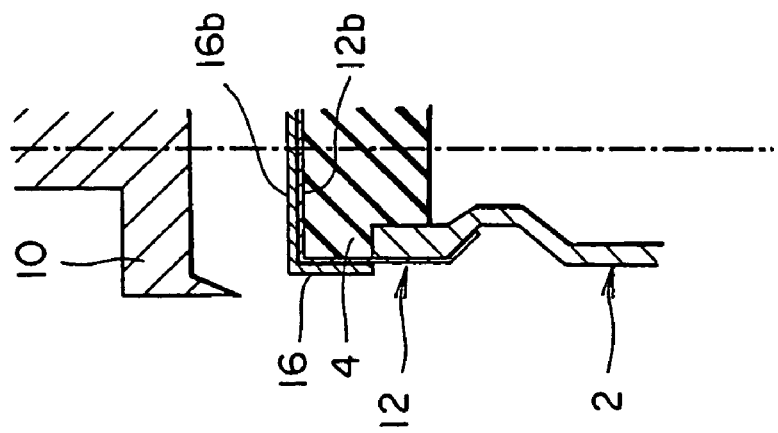

SEAL LOAD INSPECTION APPARATUS

BACKGROUND OF THE INVENTION AND RELATED ART STATEMENT

The present invention relates to a seal load inspection apparatus which is installed in or separately provided from a capping unit which drives a rubber plug into a vessel such as vial and then applies a metal cap over the rubber plug and tightens it around the full perimeter while applying a load to the metal cap, and in particular, to such apparatus which allows a seal capacity of the rubber plug to be confirmed by detecting a load acting on the metal cap upon completion of the tightening operation.

A vial which is filled with a medication is sealed, for example, by driving a rubber plug into an opening thereof after it is filled with a content, fitting a cap formed of a metal such as aluminum over the rubber plug and tightening the cap by folding the skirt (lower end) of the cap inwardly.

A sealing load of such a vial depends on the seal capacity of the rubber plug. To achieve a sufficient sealing performance with the rubber plug, the latter must be maintained in an adequately compressed condition. If the tightening operation were performed without a compression of the rubber plug, a failure of obtaining a satisfactory seal capacity results.

Accordingly, it is a general practice that a tightening around the metal cap takes place while a vessel fitted with the metal cap over the driven rubber plug is loaded as by a pressure block. However, the metal cap having its skirt (lower end) folded inwardly in conformity to the outer profile of the vessel may spring back or the folded portion may tend to be restored to its original configuration upon completion of the tightening operation, creating a clearance with respect to the outer surface of the vessel. As a consequence, the rubber plug may be restored due to its own resilience by an amount corresponding to such clearance when the load which has been applied from over the metal cap is released, and the load of the cap which prevails subsequent to the completion of the tightening operation may be diminished from the load applied during the tightening operation. In such an instance, the seal capacity of the rubber plug is likely to be insufficient. Thus, there is a need to detect a load acting on the cap subsequent to the completion of the tightening operation in order to confirm that the rubber plug provides a sufficient seal capacity.

A capping unit which detects a load during a tightening operation which takes place by applying a load from over a cap fitted over a vessel opening or a capping unit which detects a load applied when a cap is driven into a vessel opening is known in the art (see Japanese Laid-Open Patent Publications No. 61-189 and No. 8-58889, for example). In the capping unit disclosed in the first citation (which is referred to therein as a lid clamping device), a load cell is mounted on a cam which elevates a capping head (clamping head), and a load on a roll-on cap as it is tightened is detected in an in-line manner. In the capping unit disclosed in the second citation (which is referred to therein as a capper), a load cell is mounted on a bottle receptacle to detect a load as a cap is driven.

Capping units described in the above patent literature are not constructed in a manner to provide a seal capacity by a rubber plug as it is driven into a vessel, and are therefore not subject to any significant variation in the load at the end of a capping operation. A desired load can be obtained after the end of a capping operation by applying a preset load during the capping operation, and hence, there is no detection of a variation in the load upon releasing the load at the end of the capping step such as a tightening operation.

OBJECT AND SUMMARY OF THE INVENTION

Accordingly, it is an object of the present invention to provide a seal load inspection apparatus for use with a capping unit in which a tightening of a metal cap tales place by folding a lower end of the cap which is fitted over a driven rubber plug while applying a load thereon, the apparatus being capable of detecting a load acting on the cap not only during, but also subsequent to the completion of a tightening operation.

Above object is accomplished by providing a seal load inspection apparatus installed in a capping unit in which a metal cap fitted over a vessel having a rubber plug driven into it is tightened, the apparatus comprising a pressure block for applying a load to a rubber plug through a cap to cause it to be compressed, an air cylinder for elevating the pressure block, a tightening member for folding a skirt of the cap inwardly, rotating means for rotating at least one of the tightening member and a table on which a vessel is placed, moving means for moving the tightening member to a position where it abuts against the cap and to a position where it does not abut, load detecting means for detecting a load applied to the cap, displacement detecting means for detecting a displacement of an elevation of a top surface of the cap, air pressure control means for controlling the air pressure of the air cylinder, and load value memory means for storing a load detected by the load detecting means, an arrangement being such that a load is initially applied to the metal cap to cause the rubber plug to be compressed and the tightening member performs a tightening operation under this condition by folding the skirt of the cap inwardly, the load is once released, and the air pressure control means is controlled so that the load increases gradually beginning from a low value which does not cause the rubber plug to be compressed to a higher value, and a load which is detected at an instant in the course of increasing the load when the elevation of the top surface of the cap is displaced is determined to be a seal load which prevails subsequent to the end of the tightening operation.

Above object is also accomplished by a seal load inspection apparatus which detects a seal load of a metal cap fitted over a vessel into which a rubber plug is driven when the cap has been subjected to a tightening operation, the apparatus comprising a pressure block for applying a load on a rubber plug through a cap to cause the rubber plug to be compressed, an air cylinder for elevating the pressure block, load detecting means for detecting a load applied to the cap, displacement detecting means for detecting a displacement of the elevation of a top surface of the cap, air pressure control means for controlling an air pressure of the air cylinder, and load value memory means for storing a load value detected by the load detecting means, an arrangement being such that the air pressure control means is controlled so that a load applied to the cap is gradually increased from a low value which does not cause the rubber plug to be compressed to a higher value, and a load detected at an instant in the course of increasing the load when a displacement occurs in the elevation of the top surface of the cap is determined to be a seal load which prevails subsequent to the tightening operation.

In addition, above object is accomplished by a seal load inspection apparatus which detects a seal load of a metal cap fitted over a vessel into which a rubber plug is driven subsequent to a tightening operation, the apparatus comprising a pressure block disposed to be capable of abutment against the top surface of the cap, a table on which the vessel is placed, an air cylinder for elevating the table, load detecting means for detecting a load applied to the cap, displacement detecting means for detecting a displacement in the elevation of the table, air pressure control means for controlling the air pressure of the air cylinder, and load value memory means for storing a load value detected by the load detecting means, an arrangement being such that the table is elevated upward under a low load which does not cause the rubber plug to be compressed to bring the top surface of the cap into abutment against the pressure block, whereupon the load applied to the table is increased, and a load detected at an instant in the course of increasing the load when a displacement occurs in the elevation of the table is determined to be a seal load which prevails after the completion of the tightening operation.

In the seal load inspection apparatus according to the present invention, a metal cap is fitted over a vessel into which a rubber plug is driven, a tightening operation takes place by applying a load to the top surface of the cap to cause the rubber plug to be compressed while folding the skirt of the metal cap inwardly, and subsequently, the load applied to the cap is once released, and thereafter the load is gradually increased beginning with a low load which is insufficient to cause a completion of the rubber plug to a higher value. In this manner, it is possible to confirm a seal capacity of the rubber plug upon completion of the tightening operation exactly, allowing defective products to be detected reliably.

BRIEF DESCRIPTION OF THE DRAWINGS

FIGS. 4A to 4D are illustrations of sequential operations of the capping nit;

FIG. 5 graphically shows a change in the elevation of a pressure block and a change in the load acting on a cap during the operation of the capping unit;

FIG. 6 graphically shows a relationship between an air pressure supplied to an elevating air cylinder and a load acting on the cap;

FIG. 7 is a plan view illustrating a layout of a seal load inspection apparatus according to a second embodiment;

FIGS. 9A to 9C illustrate sequential operations of the seal load inspection apparatus;

DETAILED DESCRIPTION OF PREFERRED EMBODIMENTS

Figure 1:
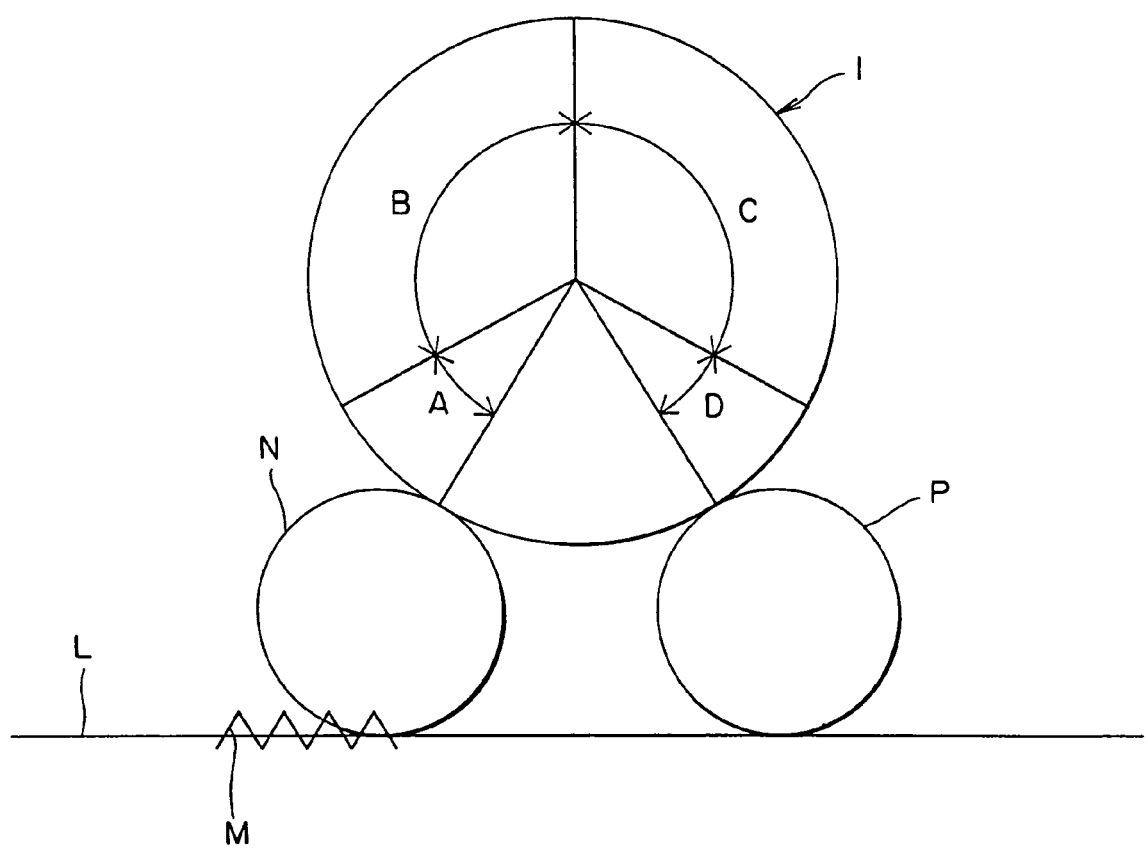
FIG. 1 is a plan view schematically illustrating an overall arrangement of a capping unit which is provided with a seal load inspection apparatus according to one embodiment of the present invention.

Several embodiments of the present invention shown in the drawings will now be described. A capping unit (generally indicated by a denotation 1) provided with a seal load inspection apparatus according to one embodiment of the present invention comprises a table 6 on which a vessel 2 (which is a vial into which a rubber plug 4 is driven in this embodiment) is supplied, a pressure block 10 which is elevated up and down by an air cylinder 8, and a tightening roller 14 which tightens a cap 12 which is formed of a metal such as aluminum and which is fitted over the rubber plug 4 driven into the vial 2.

A number of vials 2 which are conveyed in succession by a vessel conveying conveyor L are separated from each other into a giving spacing by an in-feed screw M, and are introduced into the capping unit 1 through an inlet star wheel N. These vials 2 are subject to a tightening of metal caps 12 and an inspection of a seal load within the capping unit 1, and are delivered onto the vessel conveying conveyor L through an outlet star wheel P to be fed to a succeeding step.

The vial 2 includes an opening 2a, into which the rubber plug 4 is a press fit, a portion 2b of a reduced diameter which is less than the external diameter of the opening 2a, and the outer surface of the opening 2a and the portion 2b are connected together by a tapered surface 2c. The vial 2 also includes a portion 2e of an increased diameter which is located below the portion 2b of a reduced diameter and which continues to a bottom 2d.

The rubber plug 4 which is disposed as a press fit in the opening 2a of the vial 2 includes a press fit region 4a having an external diameter which is substantially equal to or slightly greater than the internal diameter of the opening 2a, and a head 4b of an increased diameter having an external diameter which substantially matches the external diameter of the opening 2a. A metal cap 12 which is fitted over the rubber plug 4 includes a cylindrical portion 12a which surrounds the head 4b of an increased diameter of the rubber plug 4 and the external surface of the opening 2a in the vial 2, and a top surface 12b which is located on top of the head 4b of an increased diameter. The metal cap 12 has a length such that when it is fitted over the rubber plug 4, the lower end (skirt) of the cylindrical portion 12a is located outside of the tapered portion 2c of the vial 2 or slightly below it. It is to be noted that a resin cap 16 including a cylindrical portion 16a which is shorter than the cylindrical portion 12a and a top surface 16b is integrally bonded to the metal cap 12 at a location around the outer periphery of the upper portion of the cylindrical portion 12a and over the top surface 12b adhesively.

The table 6 is mounted on a vertical rotary shaft 20 which is connected to a drive shaft of a motor (rotating means) 18, and is adapted to be rotated with the vial 2 thereon when the motor 18 is driven. The rotation of the motor 18 is controlled by a controller 22 which will be described later.

A pressure block 10 disposed above the table 6 is connected to the lower end of a rod 8a of the air cylinder 8 fixedly mounted to depend downwardly, and is adapted to be elevated up and down by an actuation of the air cylinder 8. The pressure block 10 has a shank 10a which extends upwardly from the center of the block and which is connected to the inside of the rod 8a of the air cylinder 8 by means of a lock ring 24. A ball bearing 26 is interposed between the bottom surface of the rod 8a of the air cylinder 8 and the pressure block 10, which is thus elevatable by an actuation of the air cylinder 8 and is also rotatable with respect to the air cylinder 8. The lower surface of the pressure block 10 is formed with a circular recess 10b, which is urged against the top surface 12b of the metal cap 12a which is fitted over the vial 2 (in the present embodiment, the metal cap 12 and the resin cap 16 are formed to be integral, and therefore, is urged against the top surface 16b of the resin cap 16).

The elevating air cylinder 8 is provided with a load cell 28 acting as load detecting means, which is adapted to detect a load acting on the cap 12 when the air cylinder 8 is actuated to urge the pressure block 10 against the metal cap 12.

The pressure block 10 which is elevated up and down by the actuation of the air cylinder 8 is connected with a potentiometer 30 acting as elevation detecting means which detects a change in the direction of the elevation, and the elevation of the pressure block 10 which is elevated by the air cylinder 8 is detected by the potentiometer 30.

Figure 2:
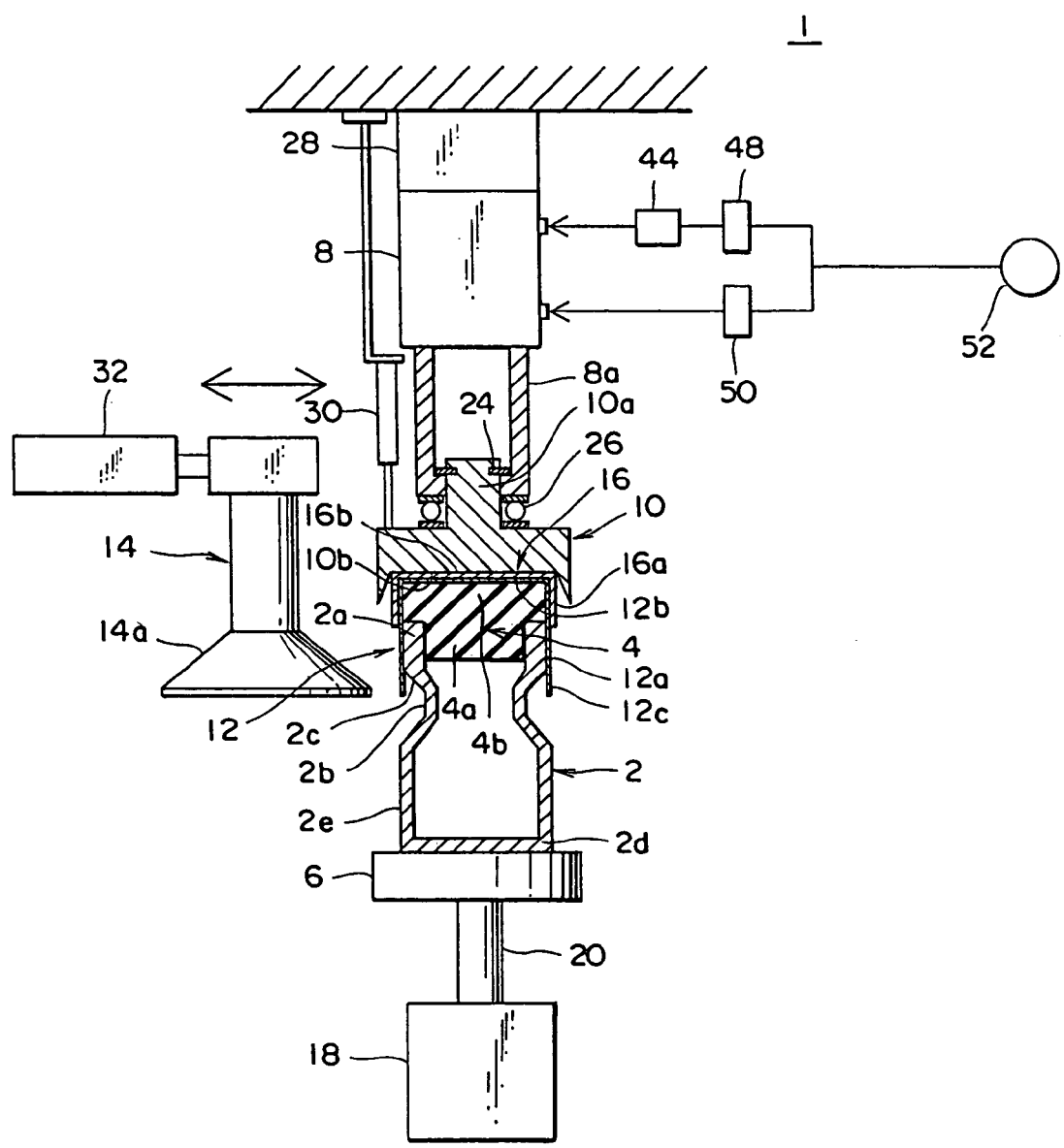
FIG. 2 is a longitudinal section showing an overall arrangement of the capping unit.

As mentioned previously, the vial 2 is formed with the tapered portion 2c at a location below the opening 2a, into which the rubber plug 4 is disposed as a press fit, and continuing to the portion 2b of a reduced diameter, thereby allowing the lower end 12c of the cylindrical portion 12a of the metal cap 12 to be folded toward the tapered portion 2c. To perform a folding of the lower end 12c of the metal cap 12a, a tightening roller 14 is disposed at a location adjacent to the pressure block 10 and the table 6 which are disposed one above another. The tightening roller 14 is formed with a pusher 14a which abuts against the lower end 12c of the cylindrical portion 12a of the metal cap 12 to fold it inwardly, the pusher 14a being sloped in substantial the same manner as the tapered portion 2c of the vial 2. The tightening roller 14 is movable horizontally by means of an air cylinder 32, and is moved between a position (refer to FIG. 4A which will be described later) where it is urged against the metal cap 12 to fold the lower end 12c of the cylindrical portion 12a inwardly and a position (see FIG. 2) where it does not abut against the metal cap 12.

A controller 22 which controls the operations of various parts of the capping unit 1 comprises a load detector 34 which detects a load applied to the metal cap 12 from the pressure block 10 in response to a signal fed from the load cell 28, and an elevation detector 36 which detects a position in the direction of the elevation of the pressure block 10 in response to a signal fed from the potentiometer 30. In addition, it comprises a load memory 38 for storing a load detected by the load detector 34 in response to a signal fed from the load cell 28 and for storing a preset proper load, and an elevation memory 40 which stores an elevation detected by the elevation detector 36 in response to a signal fed from the potentiometer 30. In addition, it comprises a comparator/decision unit 42 which compares values detected by the load detector 34 and the elevation detector 36 against values stored by the load memory 38 and the elevation memory 40 and determines whether or not they are in a proper range, and a control unit 46 which controls the operations of an auto-regulator 44 controlling an air pressure supplied to the elevating air cylinder which drives the pressure block 10 and the motor (rotating means) 18 which rotates the table 6.

The air cylinder 8 which elevates the pressure block 10 up and down has an upper and a lower pressure chamber (not shown) formed in its interior, and these pressure chambers are connected to a source of air supply 52 through solenoid operated valves 48 and 50. The pressure block 10 is elevated up and down by supplying the air to each of these pressure chambers from the source of air supply 52 or by opening the pressure chambers to the atmosphere. When tightening the lower end 12c of the metal cap 12, the air from the source of air supply 52 having a pressure which is controlled by the auto-regulator 44 is supplied to the upper pressure chamber while the lower pressure chamber is opened to the atmosphere to lower the pressure blocking 10 to urge against the metal cap 12 which is fitted over the vial 2 under a given load.

The operation of the capping unit 1 constructed in the manner mentioned above will now be described. Vessels (vials) 2, each having the rubber plug 4 driven into it and fitted with the metal cap 12 and its integral resin cap 16 over the rubber plug at a preceding step, are conveyed in succession by the conveyor L, separated from each other into a given spacing by the in-feed screw M and introduced into the capping unit 1 through the inlet star wheel N to be supplied to each of the tables 6. At the time the vial 2 is supplied to the table 6, the upper pressure chamber in the elevating air cylinder 8 is open to the atmosphere while an air pressure is supplied to the lower pressured chamber, whereby the pressure block 10 assumes a raised position.

The press fit region 4a of the rubber plug 4 which has an external diameter equal to or slightly greater than the internal diameter of the opening 2a of the vial 2 is disposed as a press fit in the opening 2a of the vial 2, and the head 4b of an increased diameter which is located above the press fit region 4a is disposed on the peripheral edge of the opening 2a of the vial 2. The external diameter of the head 4b of the rubber plug 4 is substantially equal to the external diameter of the opening 2a of the vial 2, and the cylindrical portion 12b of the metal cap 12 is fitted so as to be in contact with the outer peripheral surfaces of the head 4b of the rubber plug 4 and the opening 2a of the vial 2. The lower end 12c of the cylindrical portion 12a of the metal cap 12 which is fitted over the rubber plug 4 and the vial 2 in this manner extends to a point which is located below the opening 2a of the vial 2, and is spaced from the tapered surface 2c of the vial 2.

When the vial 2 is supplied to the table 6, the air from the source 52 is supplied through the auto-regulator 44 to the upper pressure chamber of the elevating air cylinder 8 which is disposed above the table 6, whereby the pressure block 10 is lowered. The pressure block 10 is urged against the top surface 12b of the metal cap 12 which is fitted over the vial 2 (or directly, against the top surface 16b of the resin cap 16), thus applying a load to the rubber plug 4 through the top surface 12b of the metal cap 12. An interval A shown in FIG. 1 represents an interval in which the pressure block 10 is lowered.

During the operation of the capping unit 1, the load cell 28 and the potentiometer 30 detect the load applied to the metal cap 12 (resin cap 16) and the elevation of the pressure block 10 at a given time interval, and the controller 22 recognizes signals fed from the load cell 28 and the potentiometer 30. Upper graph of FIG. 5 graphically shows a change in the elevation of the pressure block 10 as detected by the potentiometer 30 while the lower graph of FIG. 5 graphically shows a change in the magnitude of the load acting on the metal cap 12 as detected by the load cell 28. The capping step will be described below with reference to this Figure.

The magnitude of a load applied to the metal cap 12 is set up by the pressure block 10 (this commanded load is indicated by a denotation FO in the lower portion of FIG. 5). An air pressure which is required to apply the commanded load FO is previously determined experimentally so that this air pressure can be supplied to the elevating air cylinder 8. FIG. 6 graphically shows a relationship between the air pressure and the load acting on the metal cap 12. A preset air pressure is supplied through the auto-regulator 44 which is controlled by the control unit 46 within the controller 22 to the upper pressure chamber of the elevating air cylinder 8, whereby the commanded load FO is applied. Specifically, the auto-regulator 44 may be set up to provide an air pressure which can apply a load of 20 kg, for example, and this air pressure is supplied to the elevating air cylinder 8 to apply a corresponding load to the rubber plug 4.

As the elevating air cylinder 8 is actuated, the pressure block 10 is lowered in a gradual manner as indicated in the upper portion of FIG. 5, and when it moves into contact with the resin cap 16 which is integral with the metal cap 12 (position T1 in FIG. 5), a high load is detected momentarily. Subsequently, when the pressure block 10 is lowered to a minimum elevation (position T2 in FIG. 5), a cap load FA which substantially matches the commanded load FO is detected by the load cell 28.

After the pressure load 10 has reached the lower limit of movement, a tightening operation is initiated (position T3 in FIG. 5). When performing a tightening operation, the air cylinder 32 which is used for horizontal movement is actuated to move the tightening roller 14 toward the vial 2 to urge the pusher 14a of the tightening roller 14 against the lower end 12c of the cylindrical portion 12a of the metal cap 12 while rotating the table 6 by driving the motor 18.

The tightening operation takes place for a given time interval (which corresponds to an interval from position T3 to position T4 in this embodiment) by urging the tightening roller against the lower end 12c of the metal cap 12 and rotating the table 6. The pusher 14a of the tightening roller 14 has a slope which substantially matches the slope of the tapered surface 2c formed around the outer peripheral surface of the vial 2, whereby the lower end 12c of the metal cap 12 is folded inwardly in conformity to the profile of the tapered surface 2c of the vial (see FIG. 4A). In the tightening interval (T3 to T4 and corresponding to an interval B shown in FIG. 1), the air pressure supplied to the elevating air cylinder 8 which lowers the pressure block 10 remains constant, but the load applied to the cap 12 varies as shown in the lower portion of FIG. 5.

Upon completion of the tightening operation, the air cylinder 32 which is used for horizontal movement is actuated to retract the tightening roller 14 to a position where it cannot contact the metal cap 12. The tightening roller 14 which has been urging the lower end 12c of the metal cap 12 against the tapered surface 2c of the vial is retracted while maintaining the load applied by the pressure block 10 (the load which is detected by the load cell at this time is indicated by FA). The lower end of the metal cap 12 slightly moves away from the tapered surface 2c of the vial 2 by spring-back (see FIG. 4B).

Upon completion of the tightening operation, the load which is applied by the pressure block 10 is removed. During the tightening operation, the air pressure is supplied to the upper pressure chamber of the elevating air cylinder 8 while opening the lower pressure chamber to the atmosphere, but to remove the load, the solenoid operated valve 48 is switched to open the upper pressure chamber to the atmosphere in a similar manner as for the lower pressure chamber. When the upper and lower pressure chambers are open to the atmosphere, the load acting on the cap 12 is removed while the pressure block 10 remains lowered. When the load from the pressure block 10 is removed, the rubber plug 4 which has been compressed up to this point is allowed to expand, pushing up the pressure block 10 through the metal cap 12 (see FIG. 4C). Even though the pressure block 10 is pushed up by the rubber plug 4, upon abutment of the folded lower end 12c of the cylindrical portion 12a of the metal cap 12 against the tapered surface 2c of the vial 2, the metal cap 12 can no longer be pushed up by the resilience of the rubber plug 4, and the metal cap 12 and the pressure block 10 cease to rise thereafter (position T5 in the upper portion of FIG. 5).

The load is removed while maintaining the pressure block 10 in its lowered condition in the present embodiment, but the load may be removed by allowing the pressure block 10 to rise. In this instance, the upper pressure chamber of the air cylinder 8 to which the air pressure has been supplied during the tightening operation is made open to the atmosphere while the air pressure is supplied to the lower pressure chamber to cause the pressure block 10 to be raised. However, if the pressure block 10 is raised in order to remove the load on the metal cap 12, it is necessary that the lower pressure chamber be made open to the atmosphere to bring the pressure block 10 into abutment against the top surface 12b of the metal cap 12 subsequently.

FIG. 4C shows a condition where the metal cap 12 and the pressure block 10 have ceased to be raised by the expansion of the rubber plug 4. A displacement of the metal cap 12 and the pressure block 10 in the upward direction which has occurred at this time is indicated by denotation S1 between FIGS. 4B and 4C and FIG. 5 in the upper portion thereof. After the load is once released in this manner, a load is applied again through the top surface 12b of the metal cap 12. While maintaining the lower pressure chamber of the elevating air cylinder 8 open to the atmosphere, the compressed air is supplied from the source 52 to the upper pressure chamber through the auto-regulator 44. The auto-regulator 44 which is disposed in the path through which the air pressure is supplied to the upper pressure chamber is controlled so as to increase the supplied pressure in a gradual manner, as indicated in the lower portion of FIG. 5 from position T6 to position T8.

It is to be noted that when the load is applied again subsequent to the completion of the tightening operation, the load is gradually increased starting with a load value FB (see the lower portion of FIG. 5) which is less than the load FA which is used during the tightening operation. There is no displacement of the metal cap 12 as long as the load applied remains low, but as the applied load increases, the metal cap 12 begins to be displaced downwardly. As mentioned previously, a change in the elevation of the pressure block 10 is detected by the potentiometer 30, and a change in the cap load is detected by the load cell 18. The instant where a downward displacement of the metal cap 12 occurs (see T7 in FIG. 5) is detected by the potentiometer 30, and the load FC at this instant is detected by the load cell 28. The load FC at the instant where the potentiometer 30 has detected a displacement of the metal cap 12 is determined to be a load acting upon the metal cap 12 subsequent to the completion of the tightening operation or the seal capacity of the compressed rubber plug 4. FIG. 4D shows a compressed condition of the rubber plug 4 as a result of applying the load again from the pressure block 10. An interval C in FIG. 1 represents an inspection interval of the cap load. It should be understood that the load FB which is applied again after completion of the tightening operation at the moment when the load begins to be applied again has a low value which is insufficient to cause a compression of the rubber plug 4.

Subsequently, the upper pressure chamber of the elevating air cylinder 8 is made open to the atmosphere while the air pressure is supplied to the lower pressure chamber to raise the pressure block 10, thus completely removing the load on the metal cap 12 (see T9 in FIG. 5). An interval D in FIG. 1 represents an interval during which the pressure block 10 rises.

The load memory 38 of the controller 22 has a proper load which is required to secure the seal capacity of the rubber plug 4 in storage and the comparator/decision unit 42 compares the seal load FC upon completion of the tightening operation against the proper load, and in the event there is a departure from the proper load, it determines it to be a defective product, which is rejected. In this manner, the seal capacity of the rubber plug 4 subsequent to the tightening operation can be exactly confirmed from product to product, allowing any defective product which has an insufficient seal capacity by the rubber plug 4 to be detected.

The capping unit 1 according to this embodiment is arranged to provide a feedback control. Specifically, the comparator/decision unit 42 compares the load FC which is obtained upon completion of the tightening operation and the proper load, and whenever there is a difference therebetween which exceeds a predetermined value, the magnitude of a load applied to the top surface 12b of the metal cap 12 by the pressure block 10 is corrected during the next cap load operation in accordance with the load FC which is obtained upon completion of the tightening operation. The auto-regulator 44 is disposed in an air piping supplying the air to the air cylinder 8 which elevates the pressure block 10, and when it is necessary to correct the load to be applied to the metal cap 12, the air pressure which is supplied to the upper pressure chamber of the air cylinder 8 is automatically regulated in accordance with a signal delivered from the control unit 46 which depends on the detected load FC. By introducing the detected load into the feedback control, it is possible to control the seal capacity of the rubber plug 4 to a proper value. In addition, a load acting on the cap is normally monitored in this embodiment, and this allows the occurrence of any abnormality in the capping unit 1 to be detected.

In the present embodiment, the table 6 is rotated by the motor 18, but the tightening roller may be arranged to be rotatable so as to turn around the vial 2 over which the metal cap 12 is fitted.

Figure 8:
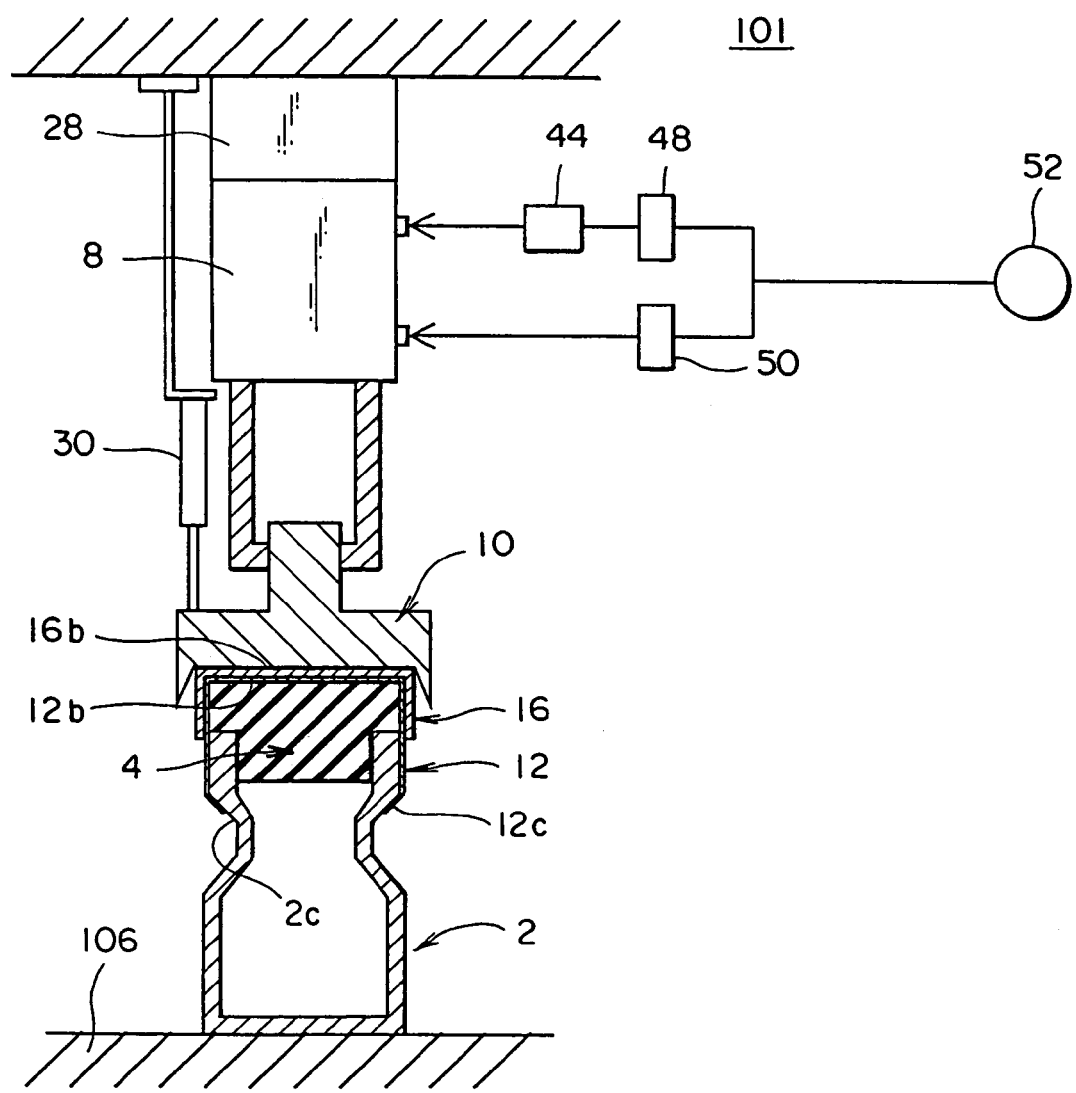
FIG. 8 is a longitudinal section of the seal load inspection apparatus according to the second embodiment.

FIGS. 7 and 8 are a plan view schematically illustrating an overall arrangement of a capping line including a seal load inspection apparatus 101 according to a second embodiment, and a schematic view showing the arrangement of the seal load inspection apparatus 101. In this embodiment, the seal load inspection apparatus 101 is provided separately from a capping unit 1 which performs a tightening of a metal cap 12. Vessels (vials which are already fitted with rubber plugs 4) which have been conveyed by the vessel conveying conveyor L are separated from each other in to a given spacing by an in-feed screw N, supplied to the capping unit 1 through an inlet star wheel M, and are discharged onto the conveyor L through an outlet star wheel P after a capping (a tightening of the metal cap) has been performed to be fed to the seal load inspection apparatus 101.

Since the seal load inspection apparatus 101 of this embodiment is provided independently from the capping unit 1 which performs a tightening of the metal cap 12, the tightening roller 14, the air cylinder 32 for horizontal movement which moves the tightening roller 14 to a position where it abuts against the metal cap 12 and a position where it does not abut and rotating means which rotates the table 6 which are used in the first embodiment are omitted, but in other respects, the arrangement is identical with the first embodiment, and accordingly, corresponding parts are designated by like denotations as used before to omit their description, and only what is required will be described below.

The seal load inspection apparatus 101 is of a type having a fixed table 106, and a vial 2 which has completed a tightening operation of the metal cap 12 in the capping unit is conveyed on the conveyor L to be supplied onto the fixed table 106. Accordingly, the vial 2 supplied to the table 106 has the lower end 12c of the metal cap 12 already folded to extend along the outer profile of the tapered portion 2c of the vial 2. Disposed above the fixed table 106 are a pressure block 10 which applies a load to the metal cap 12, an air cylinder 8 which elevates the pressure block 10 up and down, a load cell 28 which detects a load acting on the metal cap 12, and a potentiometer 30 which detects the elevation of the top surface 12b of the metal cap 12. The elevating air cylinder 8 has upper and lower pressure chambers, which are connected to a source of air supply 52 through solenoid operated valves 48 and 50 and an auto-regulator 44 in order to supply the air to or displace the air from these pressure chambers. When the air is supplied to the upper pressure chamber through the auto-regulator 44, the pressure block 10 is lowered to apply a preset load on the metal cap 12 while when the air is supplied to the lower pressure chamber, the pressure block 10 is raised.

In this embodiment, before the vial 2 is supplied to the table 106, the upper pressure chamber of the elevating air cylinder 8 is open to the atmosphere while the air is supplied to the lower pressure chamber to maintain the pressure block 10 in its raised position (a condition shown in FIG. 9A). Under this condition, when the vial 2 conveyed by the conveyor L is supplied onto the table 106, the solenoid operated valve 50 is operated to interrupt the air supply to the lower pressure chamber and to make it open to the atmosphere. The pressure block 10 then descends by its own gravity (see the upper portion of FIG. 10 from T10 to T11). As the pressure block 10 descends, a value detected by the potentiometer goes up. When the pressure block 10 which descends by its own gravity abuts against the top surface 12b of the metal cap 12 (or directly against the top surface 16b of the resin cap 16), the pressure block 10 ceases to descend (a condition shown in FIG. 9B), and a value detected by the potentiometer 30 also ceases to change (a position shown in the upper portion of FIG. 10 at T11).

The solenoid operated valve 48 connected to the upper pressure chamber of the elevating air cylinder 8 is then switched from its condition where the upper pressure chamber is open to the atmosphere in order to supply an air pressure which is set up by the auto-regulator 44 from the source 52 to the upper pressure chamber, thus urging the pressure block 10 to be lowered to apply a load on the metal cap 12. In this embodiment, the auto-regulator 44 is controlled to increase the supplied air pressure so that the load acting on the cap top surface 12b increases gradually from zero until a preset value FD is reached (see an interval from T12 to T14 in the lower portion of FIG. 10). The controller 22 has a relationship between the air pressure and the load acting on the metal cap 12 in storage, and accordingly, a load is applied in accordance with the air pressure, and the magnitude of the load is recognized by the controller 22.

Figure 3:
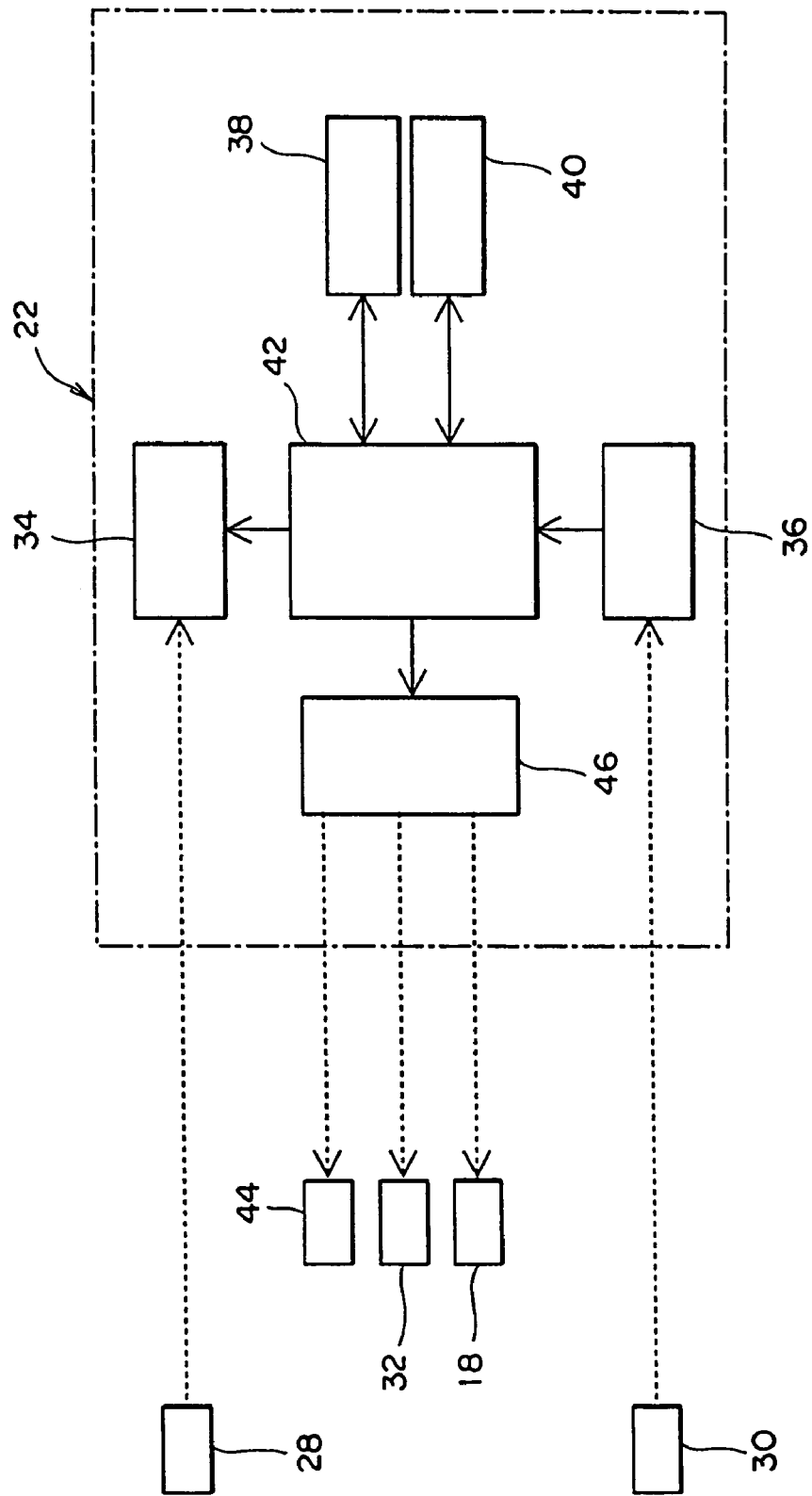
FIG. 3 is a schematic view showing control means of the capping unit.
Figure 10:
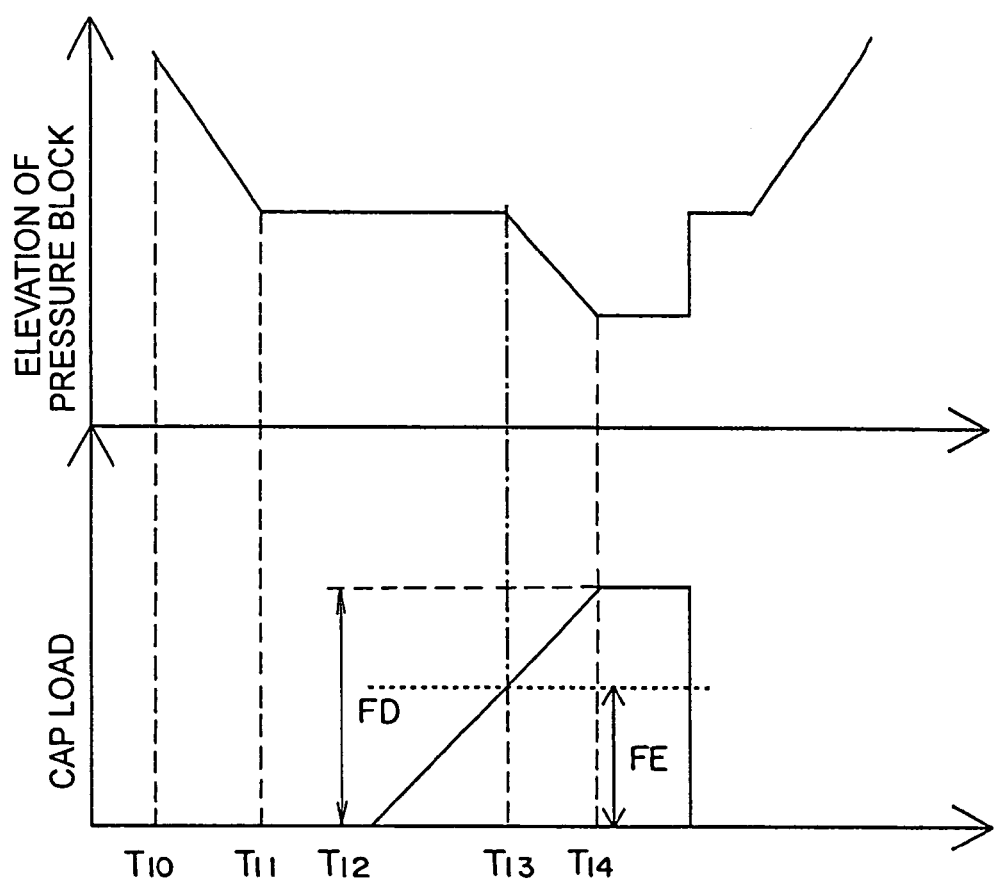
FIG. 10 graphically shows a change in the elevation of the pressure block and a change in the load acting on a cap during the operation of the seal load inspection apparatus according to the second embodiment.

When the load applied to the metal cap 12 exceeds the seal load, the rubber plug 4 is compressed, whereby the metal cap 12 begins to descend (see FIG. 9C and the upper portion of FIG. 10 at T13). Signals from the load cell 28 and the potentiometer 30 are transmitted to the controller 22 (see FIG. 3) at a given time interval (such as 0.2 msec, for example), and such signals are stored in a load memory 38 and an elevation memory 40. The controller 22 detects the instant (T13) when the rubber plug 4 shrinks and the value from the potentiometer begins to rise, and reads out a prevailing load from the load memory 38 and determines it to be a seal load FE. Also with this embodiment, the seal capacity of the rubber plug 4 subsequent to the tightening operation can be exactly confirmed, allowing any defective product having an insufficient seal capacity of the rubber seal 4 to be detected in a reliable manner. In this embodiment, a plurality of sets each including the pressure block 10, the elevating air cylinder 8 and the table 106 as shown in FIG. 8 are provided to permit a plurality of vials 2 to be processed simultaneously, but only one set may be used as well. It is also possible to utilize the vessel conveying conveyor L which conveys vessels from the capping unit 1 to the seal load inspection apparatus 101 directly as tables. In addition, the load cell 28 may be disposed on the table 106.

Figure 11:
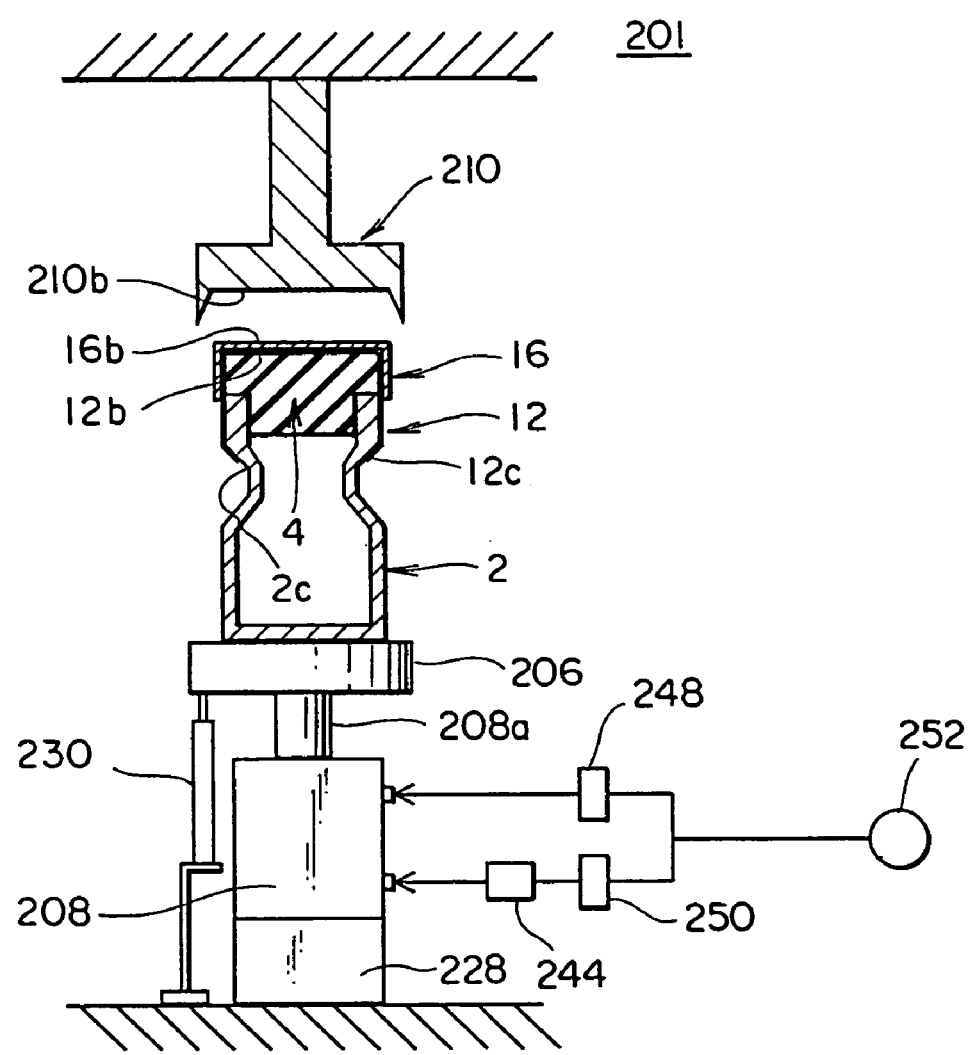
FIG. 11 is a longitudinal section of a seal load inspection apparatus according to a third embodiment.

FIG. 11 is a longitudinal section showing an arrangement of a seal load inspectional apparatus 201 according to a third embodiment. In this embodiment, in the similar manner as in the second embodiment, the seal load inspectional apparatus 201 is provided separately from the capping unit 1 at a location downstream thereof (see FIG. 7).

In the arrangement of the second embodiment, the table 106 is fixedly mounted and has a constant height. However, in the present embodiment, a table 206 is mounted on a piston rod 208a of an elevating air cylinder 208, and can be elevated up and down by supplying the air to or displacing the air from the upper and lower pressure chambers (not shown) of the elevating air cylinder 208. In order to detect the elevation of the table 206, a potentiometer 230 is mounted on the table 206. On the other hand, a pressure block 210 is secured at a location above the table 206 so as to be capable of abutment against the top surface 12b of the metal cap 12 (or more exactly, the top surface 16b of the resin cap 16) which is capped over the vessel (vial) 2 when it is raised by the table 206.

The elevating air cylinder 208 of this embodiment has upper and lower pressure chambers (not shown) which are connected through solenoid operated valves 248 and 250, respectively, to a source of air supply 252. An auto-regulator 244 is disposed in an air supply passage to a lower pressure chamber. By supplying the air pressure which is regulated by the auto-regulator 44 which is in turn controlled by the control means 22 (see FIG. 3) to the lower pressure chamber, the table 206 is raised to urge the metal cap 12 against the pressure block 210 to produce a given load thereon. Accordingly, in this embodiment, the load cell 228 which detects the load is provided on the side of the air cylinder 208 which elevates the table 206.

With the seal load inspection apparatus 201 constructed in the manner mentioned above, when the vial 2 to which a tightening operation of the metal cap 12 has been performed by the capping unit 1 is conveyed by the conveyor L to be supplied onto the table 206, the air is supplied to the lower pressure chamber of the elevating air cylinder 208 to raise the table 206. In this embodiment, the load is increased in two stages as shown in the lower portion of FIG. 13. The air pressure is controlled by the auto-regulator 44 so that the initial load FF applied in the first stage (see the lower portion of FIG. 13 from T20 to T21) is less than the seal load FG. At this load FF, the top surface 12b of the metal cap 12 is urged against the circular recess 210b in the lower surface of the pressure block 210, but the rubber plug 4 cannot be compressed since the load FF is less than the seal load FG, and the table 206 ceases to rise. The abutment of the top surface 12b of the metal cap 12 against the pressure block 210 to stop its movement is determined from a value of the potentiometer 230 which ceases to change (see T22 in FIG. 13).

Figure 12:
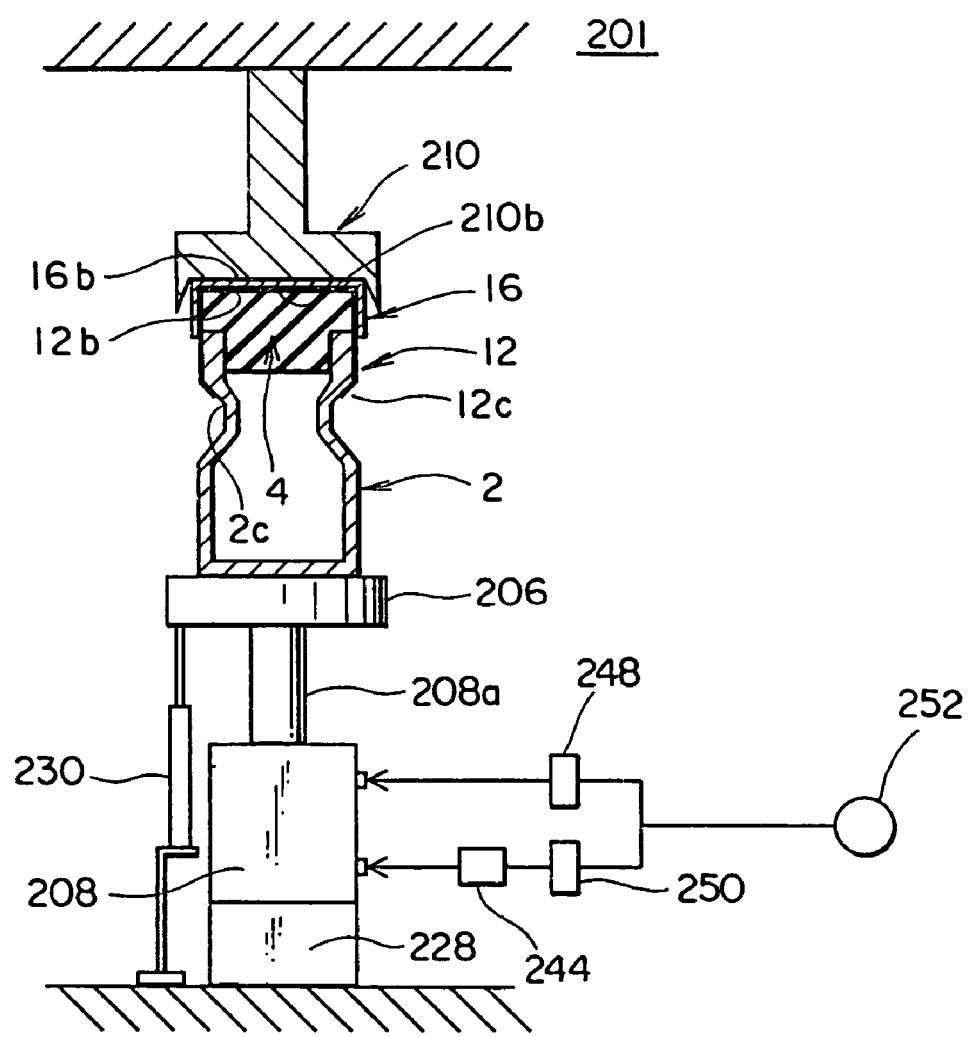
FIG. 12 is a longitudinal section of the seal load inspection apparatus according to the third embodiment when it detects a seal load.
Figure 13:
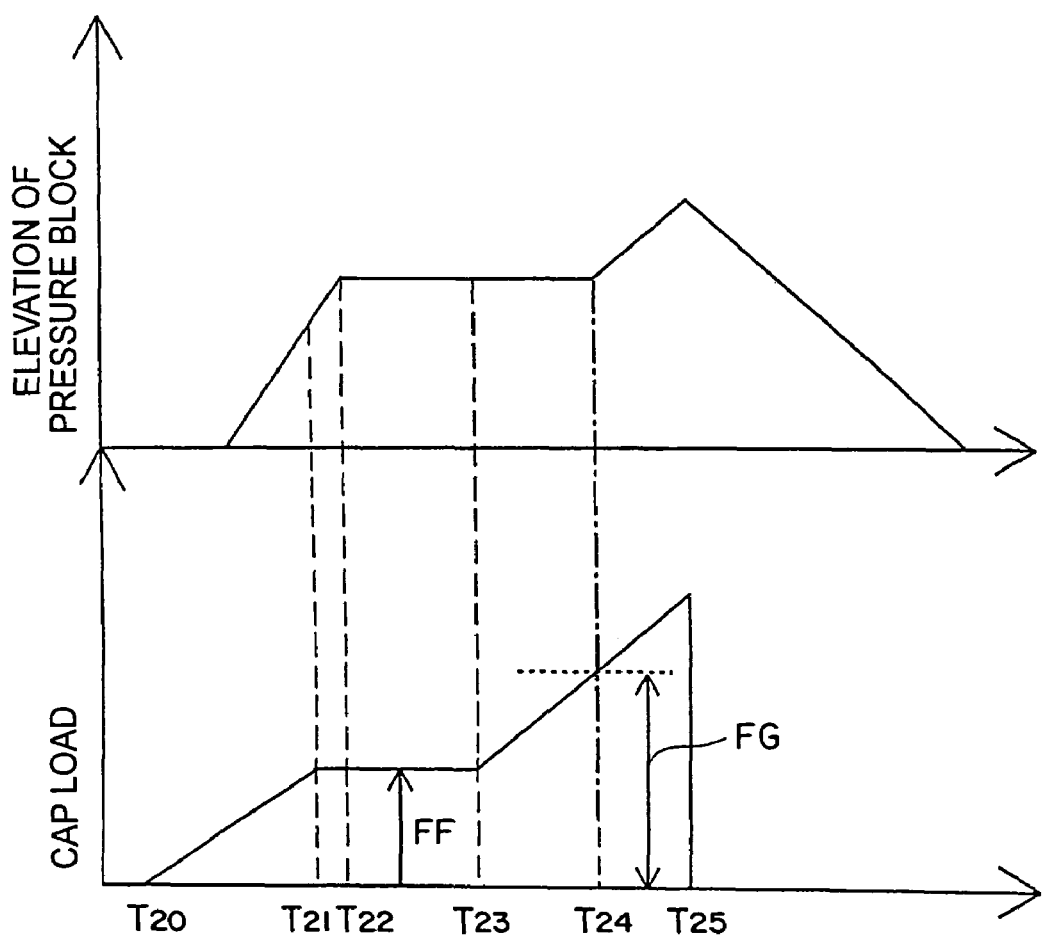
FIG. 13 graphically shows a change in the elevation of the pressure block and a change in the load acting on the cap during the operation of the seal load inspection apparatus according to the third embodiment.

To apply the load in the second stage, the air pressure supplied to the lower pressure chamber of the elevating air cylinder 208 is increased gradually (see the lower portion of FIG. 13 form T23 to T25). The load detected by the load cell 228 increases from time to time, and when it reaches a given value (see the lower portion of FIG. 13 at T24), the rubber plug 4 is compressed, allowing the table 206 to begin rising. The load FG detected by the load cell 228 at the instant when the table begins to rise as detected by a signal from the potentiometer 230 is determined to be a seal load. FIG. 12 shows a condition in which the rubber plug 4 is compressed to allow the table 206 to rise.

The load which is applied at the first stage is determined as follows:

when a load of 20 kg is applied as a tightening operation is performed by the upstream capping unit 1, the seal load subsequent to the tightening operation will be smaller than 20 kg on account of factors such as spring-back mentioned above. Assuming that this value were on the order of 15 kg, the air pressure supplied will be chosen so that the load in the first stage be lower than 15 kg while still allowing the table 206 carrying the vial 2 thereon to be raised, which may be on the order 10 kg. When so chosen, rubber plug 4 cannot be compressed if the air pressure continues to be supplied after the cap top surface 12b abuts against the pressure block 210 as a result of a rising movement of the vessel 2.

With the third embodiment, a seal load which can be obtained with the compressed rubber plug 4 as a result of a tightening of the metal cap 12 under load in the capping unit 1 can be exactly confirmed for each instance in the similar manner as in the described embodiments, allowing a defective product having a insufficient seal capacity to be detected in an reliable manner.

What is claimed is:

1. A seal load inspection apparatus provided in a capping unit which performs a tightening of a metal cap fitted over a vessel, to which a rubber plug is driven, comprising
   a pressure block for applying a load on the rubber plug through the cap to cause it to be compressed;
   an air cylinder for elevating the pressure block up and down;
   a tightening member for folding a skirt of the cap inwardly;
   rotating means for rotating the tightening member relative to a table on which the vessel is placed;
   moving means for moving the tightening member to a position where it abuts against the cap and a position where it does not abut;
   load detecting means for detecting a load applied to the cap;
   displacement detecting means for detecting a displacement in the elevation of the top surface of the cap;
   air pressure control means for controlling the air pressure in the air cylinder;
   and load value memory means for storing a load value detected by the load detecting means;
   an arrangement being such that a tightening operation is performed by the tightening member by folding a skirt of the cap inwardly under a condition that the rubber plug is compressed by applying a load on the metal cap, subsequently the load is once released and then the air pressure control means is controlled to apply a load again which is gradually increased from a low value which is insufficient to cause a compression of the rubber plug to a higher value, and a load detected in the course of increasing the load at the instant when a displacement of the elevation of the top surface of the cap occurs is determined to be a seal load upon completion of the tightening operation.

2. A seal load inspection apparatus according to claim 1 in which the tightening of the cap takes place by bringing the tightening member into abutment against the cap while rotating the table on which the vessel is placed.

3. A seal load inspection apparatus according to claim 1 in which the load detecting means is mounted on the air cylinder which elevates the pressure block up and down.

4. A seal load inspection apparatus for detecting a seal load of a metal cap fitted over a vessel into which a rubber plug is driven and which has been subjected to a tightening operation, comprising
a pressure block for applying a load on the rubber plug through the cap to cause it to be compressed;
an air cylinder for elevating the pressure block up and down;
load detecting means for detecting a load on the cap;
displacement detecting means for detecting a displacement in the elevation of the top surface of the cap;
air pressure control means for controlling the air pressure in the air cylinder;
and load value memory means for storing a load value detected by the load detecting means;
an arrangement being such that the air pressure control means is controlled so that a load is applied on the cap which increases from a low value which is insufficient to cause a compression of the rubber plug to a higher value gradually, and a load detected at the instant in the course of increasing the load when a displacement in the elevation of the top surface of the cap occurs is determined to be a seal load upon completion of the tightening operation.

5. A seal load inspection apparatus for detecting a seal load of a metal cap fitted over a vessel into which a rubber plug is driven and which has been subjected to a tightening operation, comprising
a pressure block disposed so as to be capable of abutting against a top surface of the cap;
a table on which a vessel is placed;
an air cylinder for elevating the table up and down;
load detecting means for detecting a load on the cap;
displacement detecting means for detecting a displacement in the elevation of the table;
air pressure control means for controlling the air pressure in the air cylinder;
and load value memory means for storing a load value detected by the load detecting means;
an arrangement being such that the table is raised under a low load which is insufficient to cause a compression of the rubber plug until the top surface of the cap abuts against the pressure block, subsequently a load applied to the table is increased, and a load detected at the instant during the course of increasing the load when a displacement in the elevation of the table occurs is determined to be a seal load upon completion of the tightening operation.

6. A seal load inspection apparatus according to claim 5 in which the load detecting means is mounted on the air cylinder which elevates the pressure block up and down.

7. A seal load inspection apparatus according to claim 5 in which the load detecting means is mounted on the air cylinder which elevates the tables up and down.

* * * * *